United States Patent [19]

Gilbert

[11] 4,226,042
[45] Oct. 7, 1980

[54] ANIMAL TRAP STAKE

[76] Inventor: James K. Gilbert, R.R. 6, Box 493, Connersville, Ind. 47331

[21] Appl. No.: 968,368

[22] Filed: Dec. 11, 1978

[51] Int. Cl.³ .......................................... A01M 23/24
[52] U.S. Cl. ........................................... 43/96; 43/58
[58] Field of Search ............... 43/96, 58; 52/155, 156, 52/162; 135/15 PE

[56] References Cited

U.S. PATENT DOCUMENTS

| | | | |
|---|---|---|---|
| 1,030,165 | 6/1912 | Crites | 43/96 |
| 1,201,427 | 10/1916 | Angvick | 43/96 |
| 1,309,036 | 7/1919 | Knight | 43/96 |
| 1,368,813 | 2/1921 | Lazenby | 43/96 |
| 1,376,892 | 5/1921 | Lunt | 43/96 |
| 1,409,924 | 3/1922 | Byrne | 43/96 |
| 1,634,177 | 6/1927 | Dart et al. | 43/96 |
| 1,982,393 | 11/1934 | Miller | 43/96 |
| 2,058,751 | 10/1936 | Woolfrey | 43/96 |
| 2,252,405 | 8/1941 | Navin | 43/96 |
| 2,471,804 | 5/1949 | Wheeler | 43/96 |
| 2,513,130 | 6/1950 | Arnest | 43/96 |
| 2,720,050 | 10/1955 | Pfeiffer | 43/96 |
| 3,461,600 | 8/1969 | Boupreau | 43/96 |

FOREIGN PATENT DOCUMENTS

| | | | |
|---|---|---|---|
| 12492 | 5/1933 | Australia | 43/58 |
| 530389 | 9/1956 | Canada | 43/96 |

Primary Examiner—Othell M. Simpson
Assistant Examiner—J. T. Zatarga
Attorney, Agent, or Firm—Woodard, Weikart, Emhardt & Naughton

[57] ABSTRACT

An animal trap stake for anchoring an animal trap into the ground includes a generally cylindrical central shaft member which has a flat bottom edge and an enlarged exposed head portion. Secured to the central shaft member at a location adjacent the flat edge are oppositely disposed twisted wire pairs which extend upwardly and outwardly and serve as anchoring means for the animal trap stake once the stake is inserted into the ground. A swivel member which is disposed about the central shaft member and is freely pivotal and movable along the longitudinal length of the central shaft member provides the means for attachment and retention of the animal trap chain such that the chain swivels about the central shaft member rather than winding up on the shaft member.

3 Claims, 3 Drawing Figures

ANIMAL TRAP STAKE

BACKGROUND OF THE INVENTION

This invention relates in general to anchoring devices and in particular to animal trap stakes.

The setting of animal traps is as much an art as it is a science. A hunter or trapper must be aware of what natural signs and conditions suggest likely locations for positioning the traps depending upon the animals being sought. A trapper must also know how to conceal the traps and in this regard he must also be concerned with how to secure the trap at the desired location so that once an animal is caught, the animal will not be able to escape by dragging the trap away. Animal traps are typically provided with a chain which may be wrapped around a tree trunk or fallen limb and then secured to itself. Although such a method of securing the trap may present concealment concerns, this method is also unavailable when such trees or limbs are not present in the area where the trap is desired to be located.

In order to provide other securing means, animal trap stakes have been conceived. Such stakes are designed for insertion into the ground and include means to retain the animal trap chain. One aspect of importance in the design of such stakes is that the pull-out force necessary to remove the stake from the ground be greater than that force which the animal is able to exert. A further design aspect is that the trap chain must be free to move about the stake so that the animal is allowed a limited range of movement. If the chain becomes locked, such as by being wound around the stake, no freedom of movement would be permitted for the animal to pace and the animal could actually break or sever its own leg and thus free itself while fighting and twisting in order to regain some freedom of movement. The animal trap stake disclosed herein provides improvements as to these design aspects as well as other advantages as will be apparent from the description.

SUMMARY OF THE INVENTION

An animal trap stake for anchoring an animal trap into the ground according to one embodiment of the present invention comprises a central shaft member for insertion into the ground, anchoring means disposed adjacent one end of the central shaft member for retaining the central shaft member in the ground after insertion, and a swivel member retained on the central shaft member and movable around as well as longitudinally along the length of the central shaft member, the swivel member having a chain-receiving protuberance for accepting and retaining an animal trap chain.

One object of the present invention is to provide an improved animal trap stake.

Related objects and advantages of the present invention will be apparent from the following description.

DESCRIPTION OF THE PREFERRED EMBODIMENT

Figure 1:
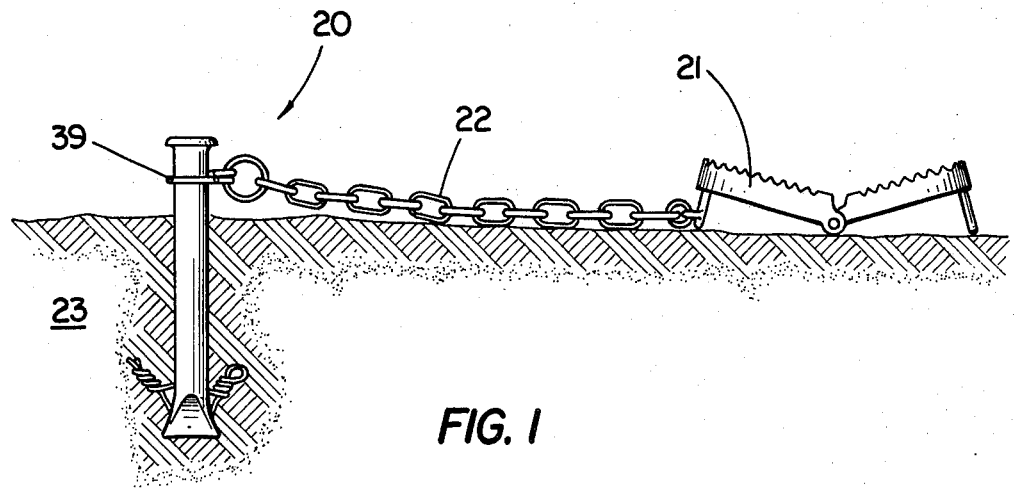
FIG. 1 is a front elevation view of an animal trap stake according to a typical embodiment of the present invention as attached to an animal trap and anchored into the ground.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated an animal trap stake 20 which is secured to an animal trap 21 by means of link chain 22. In order to securely anchor the animal trap 21 at the desired location, animal trap stake 20 is driven into the ground 23 such that only a small portion of the overall animal trap stake extends out from the ground.

Figure 2:
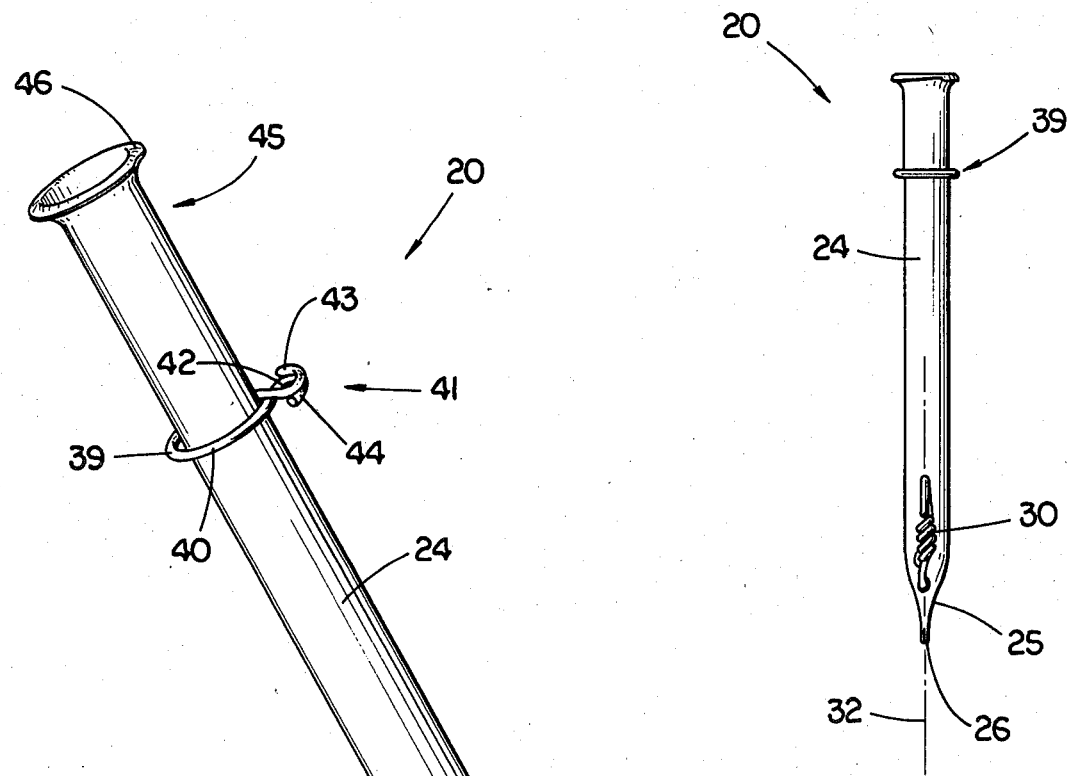
FIG. 2 is a perspective view of the FIG. 1 animal trap stake.
Figure 3:
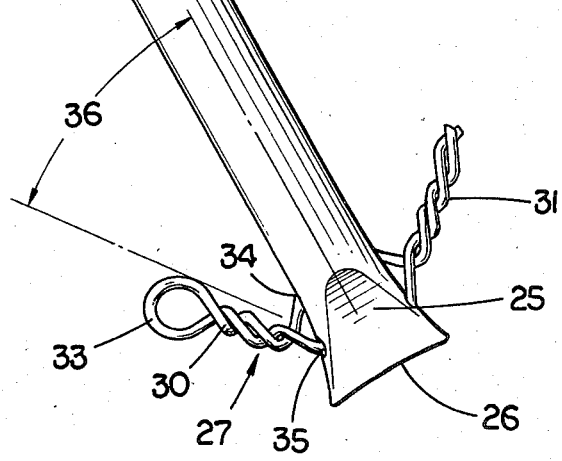
FIG. 3 is a side elevation view of the FIG. 1 animal trap stake.

Referring to FIGS. 2 and 3, the main structural features of animal trap stake 20 are illustrated. Animal trap stake 20 includes a central shaft member 24 which is generally cylindrical in axial cross section and may be, for example, a length of galvanized pipe. The first end 25 of central shaft member 24 is of a tapered configuration as can be seen in FIG. 3 and terminates in a substantially flat bottom edge 26. First end 25 may be fabricated, for example, by compressing opposite sides of central shaft member 24 such that these sides are flattened and drawn together. When working with a length of galvanized pipe, this opposite side compression causes the width dimension of the central shaft member to increase and consequently the length of flat bottom edge 26 is noticeably larger than the diameter of central shaft member 24. This substantially flat bottom edge 26 serves to facilitate the insertion of animal trap stake 20 into the ground. This flat bottom edge acts as a knife or blade-like surface which more readily penetrates through the dirt and soil than would a generally cylindrical member. By tightly compressing the two sides of central shaft member 24 together, flat bottom edge 26 will actually be sealed such that upon insertion into the ground, there will not be any access to the interior of central shaft member 24. By providing a single, thicker bottom edge as opposed to two thinner edges with clearance in between, the durability of the animal trap stake is improved and repeated usage is possible without bending or otherwise damaging the first end 25.

Once the animal trap stake 20 is inserted into the ground, for example, by striking with a hammer or mallet, it is important that the stake be suitably anchored such that once an animal is caught in trap 21 that the animal will not be able to pull the animal trap stake loose from its insertion into the ground. To enhance the anchoring of animal trap stake 20, anchoring means in the form of twisted wire member 27 is provided on central shaft member 24 adjacent first end 25. Twisted wire member 27 includes oppositely disposed and outwardly extending portions 30 and 31 which are approximately 180 degrees apart relative to the diameter of central shaft member 24 and are oriented in a common vertical plane, designated by line 32, with flat bottom edge 26. Twisted wire member 27 is one length of a 9-gage (steel wire gage) wire which is folded into a double strand and loop 33 represents the approximate midpoint of the overall length. One strand extends through hole 34 in central shaft member 24 and the other strand extends through hole 35. Once these two strands are somewhat centered with respect to central shaft member 24, the strands are twisted together into the configuration which is illustrated. By the use of steel wire of the gauge size mentioned and by tightly twisting the two strands together, twisted wire member 27 takes a permanent set and remains locked into position with respect to central shaft member 24 and the manual bending of either portion 30 or 31 is virtually impossible.

Although the angular relationship of portions 30 and 31 with respect to central shaft member 24 could be virtually in any direction, there are trade-offs which govern the size of included angle 36. This angle is defined by the longitudinal axis of central shaft member 24 and the longitudinal axis of either portion 30 or portion 31. The smaller the included angle 36 is, the easier it will be to insert animal trap stake 20 into the ground. Conversely, it will also be easier to remove the animal trap stake 20 from the ground which is not a desired parameter. By increasing the included angle 36, that is by spreading portions 30 and 31 more toward horizontal, the insertion of animal trap stake 20 is made more difficult but similarly, the pull-out force required would be much more significant. A balancing of these extremes suggests that a measurement for included angle 36 of between 35 degrees and 50 degrees is optimal and in the disclosed embodiment this included angle is 45 degrees. Although twisted wire member 27 provides an extremely convenient and inexpensive manner of providing an anchoring feature to animal trap stake 20, the providing of portions 30 and 31 by means of a twisted wire has anchoring advantages over the use of a flat plate, common to many steel fencepost stakes. The surface irregularities and convolutions as well as the thickness of the twisted wire portions 30 and 31 more readily lock into the surrounding ground and actually become more securely inserted, with time, as the surrounding ground settles.

Although a variety of chain-retaining means may be provided in combination with central shaft member 24, there is one primary consideration and this involves the freedom of movement which is to be permitted for the animal once the animal is caught within trap 21. If the link chain 22 is rigidly secured to central shaft member 24, then, as the trapped animal paces around and around, the link chain 22 may ultimately become wrapped around central shaft member 24 and will then preclude any further movement by the animal unless the animal unwinds the link chain. Unfortunately, what can occur once the link chain is locked into a wound-up position is that the animal will begin to fight and twist at the trap until such time that the animal's leg comes free by being broken or severed. In order to preclude such torturing of the animal, a swivel member 39 is provided as part of animal trap stake 20 and swivel member 39 is disposed along the length of central shaft member 24. By permitting swivel member 39 to travel longitudinally along central shaft member 24 as well as turn freely around the outside diameter, a caught animal will be permitted relatively free movement within the confines of the length of chain 22. Swivel member 39 includes a first loop portion 40 which is generally circular and of an inside diameter slightly larger than the outside diameter of central shaft member 24. Outwardly extending from central shaft member 24 as part of swivel member 39 is a chain-receiving protuberance 41 which includes a chain-receiving hole 42. Although a variety of swivel member designs are possible, it is important that the swivel member be able to freely turn about the outside diameter of central shaft member 24. The construction disclosed herein is preferred in that it employs a single length of 9-gage (steel wire gage) wire which is formed of a double "S" design such that chain-receiving protuberance 41 is arranged with a first curved portion 43 at one end of the length of wire and with a second, oppositely curved portion 44 at the other end of the length of wire. Although these two curved portions are open along one part of their circumference, they are overlappingly and oppositely arranged with respect to each other such that hole 42 is defined therethrough between the open parts.

In order to prevent the removal of swivel member 39 from central shaft member 24 and in order to provide a larger surface area for the pounding of animal trap stake 20 into the ground, the uppermost end 45 of central shaft member 24 is provided with an enlarged head portion 46 which may be, for example, a flared end. In lieu of a flared end, it is possible to internally thread the inside diameter of central shaft member 24 at end 45 and then insert a correspondingly threaded plug member with an enlarged head.

Although the animal trap stake 20 disclosed herein is approximately 10 to 12 inches in overall length and 0.75 inches in outside diameter, it is to be understood that depending upon the animal being trapped that these various dimensions may be varied in either direction. Similarly, in order to increase the requisite pull-out force for the animal trap stake additional twisted wire members 27 could be incorporated at various points along the surface of central shaft member 24 and these additional twisted wire members could be oriented around the diameter of central shaft member from each other such as to provide a multibarbed effect. However, inasmuch as substantially flat bottom edge 26 serves as a ground break to facilitate the insertion of twisted wire member 27 (both lying in a common vertical plane), the inclusion of additional twisted wire members may pose a certain problem as far as the insertion procedure.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. An animal trap stake for anchoring an animal trap into the ground, said animal trap stake comprising:
    a length of hollow pipe having an outwardly flared enlarged portion at a first end and a flattened blade portion at the opposite end;
    a "figure 8" swivel member having a first larger loop and a second smaller loop, said first larger loop being slidably received around said length of hollow pipe; and
    two oppositely disposed anchoring arms secured to said length of hollow pipe adjacent said flattened blade portion and defining an acute included angle with the longitudinal axis of said length of hollow pipe, said flattened blade portion and said two oppositely disposed anchoring arms being substantially centered in the same geometric plane.

2. An animal trap stake for anchoring an animal trap into the ground, said animal trap stake comprising:

a central shaft member for insertion into the ground;

anchoring means disposed adjacent a first end of said central shaft member for retaining said central shaft member in said ground after insertion, said anchoring means including two oppositely disposed and outwardly extending lengths of wire, each length of wire extending through said central shaft member, said lengths of wire being twisted together on opposite sides of said central shaft member thereby securing said twisted lengths of wire to said central shaft member, each of said twisted lengths of wire being oriented relative to said central shaft member to form an acute included angle with the longitudinal axis of said central shaft member; and a swivel member retained on said central shaft member and movable around and longitudinally along the length of said central shaft member, said swivel member having a chain-receiving protuberance for accepting and receiving an animal trap chain.

3. The animal trap stake of claim 2 wherein said central shaft member includes an exposed end opposite said first end, said exposed end having an enlarged head for suitably preventing said swivel member from sliding off of said central shaft member.

* * * * *